United States Patent
Kobayashi

(10) Patent No.: US 9,405,612 B2
(45) Date of Patent: Aug. 2, 2016

(54) FAULT REPAIR APPARATUS, FAULT REPAIR METHOD AND STORAGE MEDIUM STORING FAULT REPAIR PROGRAM

(71) Applicant: NEC Corporation, Tokyo (JP)

(72) Inventor: Yuusuke Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 84 days.

(21) Appl. No.: 14/188,596

(22) Filed: Feb. 24, 2014

(65) Prior Publication Data

US 2014/0245061 A1    Aug. 28, 2014

(30) Foreign Application Priority Data

Feb. 28, 2013    (JP) ................. 2013-039192

(51) Int. Cl.
    *G06F 11/00*    (2006.01)
    *G06F 11/07*    (2006.01)

(52) U.S. Cl.
    CPC ........ *G06F 11/0793* (2013.01); *G06F 11/0706* (2013.01); *G06F 11/076* (2013.01); *G06F 11/0772* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 5,737,766 A * | 4/1998 | Tan | ................. | 711/170 |
| 5,909,657 A * | 6/1999 | Onishi | ............... | G01R 31/2834 |
| | | | | 702/108 |
| 6,011,740 A * | 1/2000 | Trimberger | ................. | 365/221 |
| 6,298,016 B1 * | 10/2001 | Otsuka | ............ | G11B 20/00086 |
| | | | | 369/14 |
| 6,874,108 B1 * | 3/2005 | Abramovici et al. | ......... | 714/725 |
| 6,973,608 B1 * | 12/2005 | Abramovici et al. | ......... | 714/725 |
| 7,146,598 B2 * | 12/2006 | Horanzy | ........................ | 716/128 |
| 7,269,724 B1 * | 9/2007 | Trimberger et al. | .......... | 713/100 |
| 7,509,547 B1 * | 3/2009 | Han et al. | ....................... | 714/725 |
| 7,619,438 B1 * | 11/2009 | Trimberger | ..................... | 326/10 |
| 7,685,485 B2 * | 3/2010 | Vo et al. | ......................... | 714/725 |
| 7,823,046 B2 * | 10/2010 | Hirabayashi | .................... | 714/764 |
| 7,906,984 B1 * | 3/2011 | Montminy et al. | .............. | 326/10 |
| 2002/0066056 A1 * | 5/2002 | Suzuki | .................... | G11C 29/10 |
| | | | | 714/720 |
| 2004/0017629 A1 * | 1/2004 | Lamberts | ................ | G11B 5/012 |
| | | | | 360/53 |
| 2008/0294954 A1 * | 11/2008 | Katagiri | ................. | G06F 3/0617 |
| | | | | 714/727 |

(Continued)

FOREIGN PATENT DOCUMENTS

| | | |
|---|---|---|
| JP | 08-044581 A | 2/1996 |
| JP | 09-062528 | 3/1997 |

(Continued)

*Primary Examiner* — Amine Riad
(74) *Attorney, Agent, or Firm* — Wilmer Cutler Pickering Hale and Dorr LLP

(57) ABSTRACT

Disclosed is a fault repair apparatus capable of reducing time which fault repair processing needs.
The fault repair apparatus according to an exemplary aspect of the invention includes, a detection unit that detects a fault in the integrated circuit being equipped with a memory storing configuration data (config-data), and a circuit element whose logic operation is defined by the config-data; and outputs fault information; a memory unit that memorizes a fault area specification table which correlates whether or not a description in the config-data related to the fault information exists in any of memory areas to identification information which identifies the memory area; a specification unit that specifies a failed memory area from the fault information and the fault area specification table; and a correction unit that, about the config-data stored in the failed memory area, detects and corrects error data which does not agree with an expected value.

10 Claims, 6 Drawing Sheets

(56) References Cited

U.S. PATENT DOCUMENTS

| | | | |
|---|---|---|---|
| 2010/0241900 A1* | 9/2010 | Check et al. | 714/15 |
| 2011/0055646 A1* | 3/2011 | Mukherjee | G11C 29/40 714/719 |
| 2013/0007679 A1* | 1/2013 | Mendel et al. | 716/106 |
| 2014/0095947 A1* | 4/2014 | Mozak | G11C 29/56 714/718 |
| 2014/0229666 A1* | 8/2014 | Schoenborn | G11C 29/56 711/105 |
| 2015/0161323 A1* | 6/2015 | Frischke | 714/5 |

FOREIGN PATENT DOCUMENTS

| | | |
|---|---|---|
| JP | 2008-015965 | 1/2008 |
| JP | 2012-053778 A | 3/2012 |

\* cited by examiner

Fig. 4

| CIRCUIT ELEMENT | MEMORY AREA |
|---|---|
| REGISTER A | AREA 1 |
| REGISTER B | AREA 1 |
| LOGIC GATE OUTPUT A | AREA 1 |
| LOGIC GATE OUTPUT B | AREA 1 |
| REGISTER C | AREA 2 |
| LOGIC GATE OUTPUT C | AREA 2 |
| ⋮ | ⋮ |

120 FAULT AREA SPECIFICATION TABLE

FAULT REPAIR APPARATUS, FAULT REPAIR METHOD AND STORAGE MEDIUM STORING FAULT REPAIR PROGRAM

This application is based upon and claims the benefit of priority from Japanese Patent Application No. 2013-039192, filed on Feb. 28, 2013, the disclosure of which is incorporated herein in its entirety by reference.

TECHNICAL FIELD

The present invention relates to a fault repair apparatus, a fault repair method and a fault repair program which detect and repair faults of an integrated circuit of which logic operation is defined by configuration data.

BACKGROUND ART

Since it is possible to update logic functions also after product shipment, a programmable integrated circuit such as an FPGA (Field Programmable Gate Array) is used in various computer systems. The FPGA includes a configuration data storage memory which stores configuration data to define logic operation and a built-in circuit which executes the logic operation defined by the configuration data.

In case, a fault, for example, such as bit flip by a soft error occurs in the configuration data storage memory, since contents of the configuration data change, the FPGA malfunctions. In recent years, with the advance of capacity increase in the configuration data storage memory, occurrences of faults about the FPGA due to a soft error and so on are increasing. From such a background, a technology to avoid or repair a fault in the FPGA is growing in importance.

As a technology to cope with such the fault in the FPGA, an apparatus which divides the FPGA into a plurality of physical layout areas, and for each layout area, memorizes in advance the configuration data for realizing target logic function not using the layout area concerned is disclosed in Japanese Unexamined Patent Application Publication No. 1997-62528. When a fault in the FPGA is detected, this apparatus specifies a layout area where the fault occurred, makes the layout area where the fault occurred to an unused state by revising the original configuration data to the configuration data which does not use the layout area concerned, and continues operation of the system.

Also, in Japanese Unexamined Patent Application Publication No. 2008-15965, an apparatus which, in case a fault in the FPGA is detected, by comparing the configuration data about the FPGA with an expected value, determines whether the fault is caused by a soft error in the configuration data storage memory is disclosed. In case the fault in the FPGA is caused by the soft error in the configuration data storage memory, this apparatus repairs the fault in the FPGA by writing the expected value in the configuration data storage memory.

SUMMARY

There are various levels of faults in the FPGA. For example, in case it is a fault caused by a soft error in the configuration data storage memory as mentioned above, by correcting an error part where bit flip occurred to the original correct data, it is possible to repair the fault.

In order to detect and correct the error part in the configuration data where bit flip occurred, it is necessary to confirm whether or not the configuration data agrees with the expected value. As for the FPGAs of which capacity increase in the configuration data storage memory has advanced in recent years, it becomes a problem that processing to confirm whether or not the configuration data agrees with the expected value takes time. However, Japanese Unexamined Patent Application Publication No. 1997-62528 and Japanese Unexamined Patent Application Publication No. 2008-15965 mentioned above do not refer in particular to the technology for solving this problem.

One of the objects of the present invention is to provide a fault repair apparatus, a fault repair method and a fault repair program which solved the problem mentioned above.

A fault repair apparatus according to an exemplary aspect of the present invention includes, a detection unit that detects a fault in the integrated circuit being equipped with a memory capable of being updated and storing configuration data, and a circuit element whose logic operation is defined by the configuration data, and outputs fault information; a memory unit that memorizes a fault area specification table which correlates whether or not a description in the configuration data related to the fault information exists in any of a plurality of memory areas which the memory includes to identification information capable of identifying the memory area; a specification unit that specifies a fault occurring memory area which is the memory area in which the fault occurred from the fault information and the fault area specification table; and a correction unit that, about the configuration data stored in the fault occurring memory area, and on the basis of error detection and correction code data about the configuration data concerned, detects and corrects error data which does not agree with an expected value.

A fault repair method according to an exemplary aspect of the present invention includes, by an information processing apparatus, detecting a fault in the integrated circuit being equipped with a memory capable of being updated and storing configuration data, and a circuit element whose logic operation is defined by the configuration data, and outputting fault information; by the information processing apparatus, memorizing a fault area specification table which correlates whether or not a description in the configuration data related to the fault information exists in any of a plurality of memory areas which the memory includes to identification information capable of identifying the memory area; by the information processing apparatus, specifying a fault occurring memory area which is the memory area in which the fault occurred from the fault information and the fault area specification table; and by the information processing apparatus, about the configuration data stored in the fault occurring memory area, and on the basis of error detection and correction code data about the configuration data concerned, detecting and correcting error data which does not agree with an expected value.

A non-transitory computer-readable medium according to an exemplary aspect of the present invention stores a computer program causing a computer to realize a detection function that detects a fault in the integrated circuit being equipped with a memory capable of being updated and storing configuration data, and a circuit element whose logic operation is defined by the configuration data, and outputs fault information; a memory function that memorizes a fault area specification table which correlates whether or not a description in the configuration data related to the fault information exists in any of a plurality of memory areas which the memory includes to identification information capable of identifying the memory area; a specification function that specifies a fault occurring memory area which is the memory area in which the fault occurred from the fault information and the fault area specification table; and a correction function that, about the configuration data stored in the fault occurring memory area, and on the basis of error detection and correction code data about the configuration data concerned, detects and corrects error data which does not agree with an expected value.

BRIEF DESCRIPTION OF THE DRAWINGS

Exemplary features and advantages of the present invention will become apparent from the following detailed description when taken with the accompanying drawings in which:

FIG. 4 is an exemplary configuration of a fault area specification table in the first exemplary embodiment of the present invention;

EXEMPLARY EMBODIMENT

Hereinafter, exemplary embodiments of the present invention will be explained in detail with reference to drawings.

First Exemplary Embodiment

Figure 1:
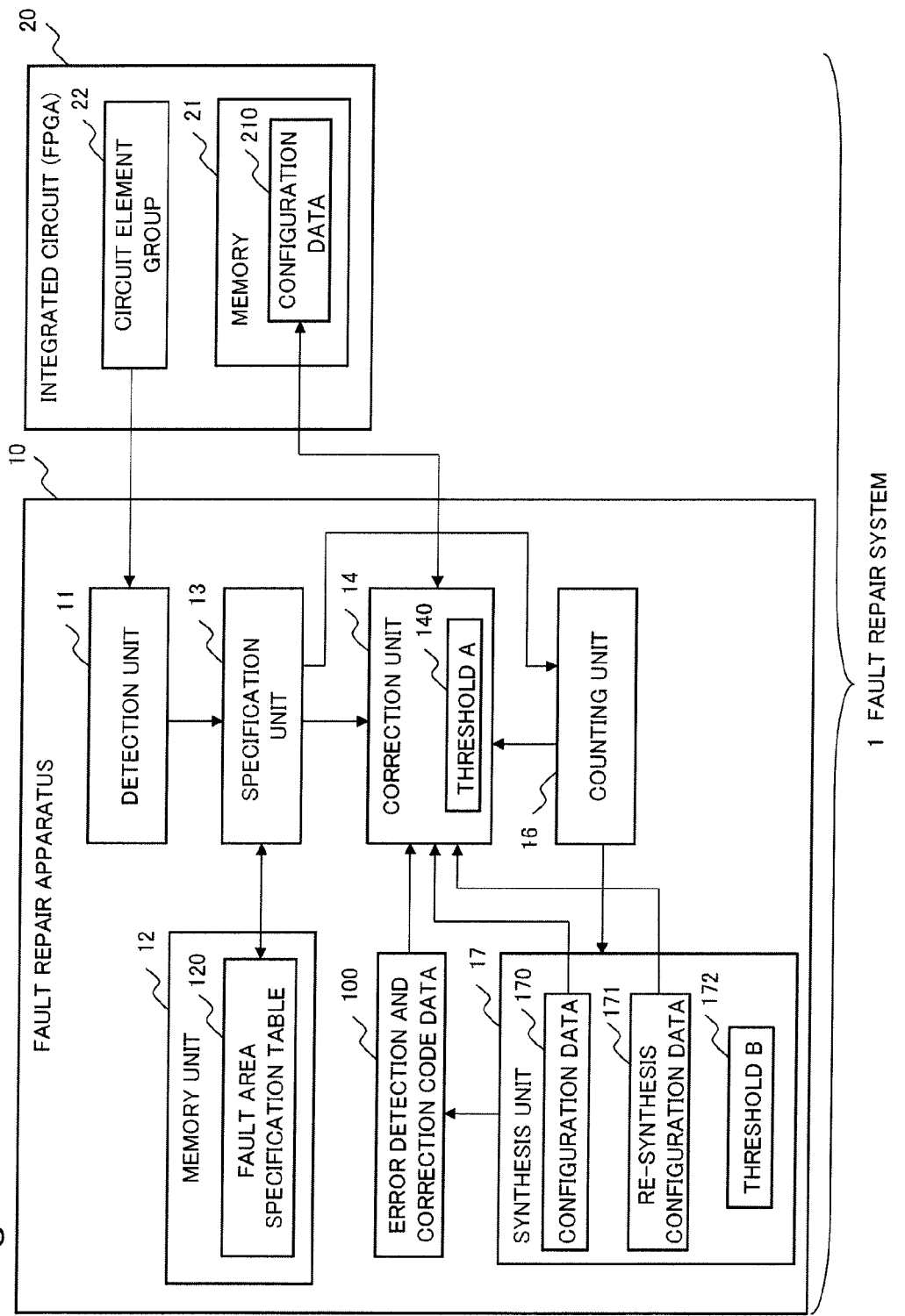
FIG. 1 is a block diagram showing a structure of a fault repair system of a first exemplary embodiment of the present invention.

FIG. 1 is a block diagram showing conceptually a structure of a fault repair system 1 of the first exemplary embodiment. The fault repair system 1 of this exemplary embodiment includes a fault repair apparatus 10 and an integrated circuit 20.

The integrated circuit 20 is a programmable integrated circuit such as an FPGA, is installed in an information processing apparatus (not shown) and so on, and includes a memory 21 and a circuit element group 22. The circuit element group 22 is a circuit element built-in in the integrated circuit 20, and logic operation is determined by configuration data 210 stored in the memory 21. The memory 21 includes a plurality of memory areas, and identification information is given to each memory area. The circuit element group 22 includes a plurality of circuit elements, and identification information is given to each circuit element.

The memory 21 and the circuit element group 22 include a memory area which is unused at the time of normal operation and circuit elements corresponding to the memory area concerned respectively. This unused memory area is, in case a fault occurring number which occurred about an identical memory area reaches a certain threshold, one which is used as a fault evasion area to substitute a fault occurring memory area in order to avoid the fault.

The fault repair apparatus 10 includes a detection unit 11, a memory unit 12, a specification unit 13, a correction unit 14, a counting unit 16 and a synthesis unit 17. There are cases when the detection unit 11, the memory unit 12, the specification unit 13, the correction unit 14, the counting unit 16 and the synthesis unit 17 are electronic circuits, and cases when they are realized by a computer program and a processor which operates according to the computer program.

The detection unit 11 detects a fault which occurred in the integrated circuit 20 and sends identification information which can identify a circuit element in the circuit element group 22 in which the fault occurred to the specification unit 13.

The memory unit 12 memorizes a fault area specification table 120. An exemplary configuration of the fault area specification table 120 is shown in FIG. 4. The fault area specification table 120 memorizes information about in which memory area in the memory 21 data in the configuration data 210 which defines logic operation about each circuit element in the circuit element group 22 exists. Specifically, the fault area specification table 120 memorizes identification information which can identify a circuit element 1200 and identification information which can identify a memory area 1201 by correlating them. For example, configuration data which defines logic operation about a register A which is a circuit element is stored in a memory area of an area 1 in the memory 21.

In case identification information which can identify a fault occurring circuit element is received from the detection unit 11, the specification unit 13 compares the identification information which can identify the fault occurring circuit element with the fault area specification table 120. As a result, the specification unit 13 specifies in which memory area in the memory 21 the configuration data which defines logic operation about the fault occurring circuit element is stored. The specification unit 13 sends the identification information which can identify the fault occurring memory area which was specified by the processing mentioned above to the correction unit 14 and the counting unit 16.

The counting unit 16 memorizes the fault occurring number for each fault occurring memory area. In case the identification information which can identify the fault occurring memory area is received from the specification unit 13, the counting unit 16 adds 1 to a numerical value which shows the fault occurring number about the fault occurring memory area concerned. After updating the count value which shows the fault occurring number for each fault occurring memory area, the counting unit 16 sends the identification information which can identify the fault occurring memory area and the count value to the correction unit 14 and the synthesis unit 17. When the count value reaches a certain numerical value, the counting unit 16 resets the count value.

The synthesis unit 17 memorizes configuration data 170 which is base data of the configuration data 210. In case no fault occurs in the memory 21, the configuration data 170 and the configuration data 210 in the memory 21 will be identical data. The synthesis unit 17 receives the count value which shows the fault occurring number for each fault occurring memory area from the counting unit 16. In case the count value is equal to a threshold B 172, the synthesis unit 17 starts processing which synthesizes re-synthesis configuration data 171 on the basis of the values which the configuration data 170 shows. There are cases when the synthesis unit 17 synthesizes the re-synthesis configuration data 171 on the basis of data such as RTL (Register Transfer Level) which was made the base data when the configuration data 170 was synthesized.

The re-synthesis configuration data 171 is configuration data about the integrated circuit 20 which is re-synthesized on the basis of the configuration data 170 so that an unused fault evasion area may be used as an area to substitute the fault occurring memory area of which the fault occurring number reached the threshold B 172. The synthesis unit 17 is equipped with an internal memory including a plurality of entries for storing a plurality of re-synthesis configuration data 171 in connection to the fault occurring memory area. After synthesizing the re-synthesis configuration data 171 by spending a certain time, the synthesis unit 17 stores the re-synthesis configuration data 171 in the internal memory by correlating it to the identification information which can identify the fault occurring memory area.

In case the re-synthesis configuration data 171 is re-synthesized newly when all entries for storing the re-synthesis configuration data 171 are in use, after erasing the re-synthesis configuration data 171 which is already stored in any entry, the synthesis unit 17 stores the new re-synthesis configuration data 171 in the entry concerned. As a standard for the synthesis unit 17 to select the entry to delete the re-synthesis configuration data 171 which is already stored, there is a case when it is made the entry about the fault occurring memory of which the fault occurring number is least. Or, as the standard, there is a case when it is made the entry about the fault occurring memory area of which time after the fault occurred lastly is longest.

In case the identification information which can identify the fault occurring memory area and the count value are received from the counting unit 16, the correction unit 14 confirms whether or not there is an error about data of a part stored in the fault occurring memory area in the configuration data 210 on the basis of error detection and correction code data 100 about the fault occurring memory area concerned. The error detection and correction code data 100 is data of an error detection and correction code which confirms whether or not there is an error part which does not agree with the expected value in the configuration data 210, and in case there is an error part, corrects the error part concerned to the expected value. The error detection and correction code data 100 exists for each memory area in the memory 21.

In case the count value is less than a threshold A 140, and an error exists in the fault occurring memory area, the correction unit 14 judges that the fault is caused by an accidental soft error in the fault occurring memory area. In this case, in case the detected error is a correctable error such as a one bit error, the correction unit 14 corrects the error concerned by using the error detection and correction code data 100. In case the detected error is not a correctable error, after obtaining the configuration data 170 from the synthesis unit 17, the correction unit 14 replaces the configuration data 210 in the memory 21 by the configuration data 170. Further, the threshold A 140 is a numerical value larger than the threshold B 172.

In case the count value is less than the threshold A 140 and an error does not exist in the fault occurring memory area, the correction unit 14 judges that the fault is caused by occurrence of a defect in the processing to define the logic operation about the circuit element group 22 by the configuration data 210. In this case, the correction unit 14 makes the integrated circuit 20 execute reinitialization.

In case the count value is equal to or more than the threshold A 140, the correction unit 14 judges that the fault is caused by a fault which is becoming solid fault in the fault occurring memory area. In this case, the correction unit 14 obtains the re-synthesis configuration data 171 about the fault occurring memory area from the synthesis unit 17 and updates the configuration data 210 in the memory 21 to the re-synthesis configuration data 171.

Figure 2:
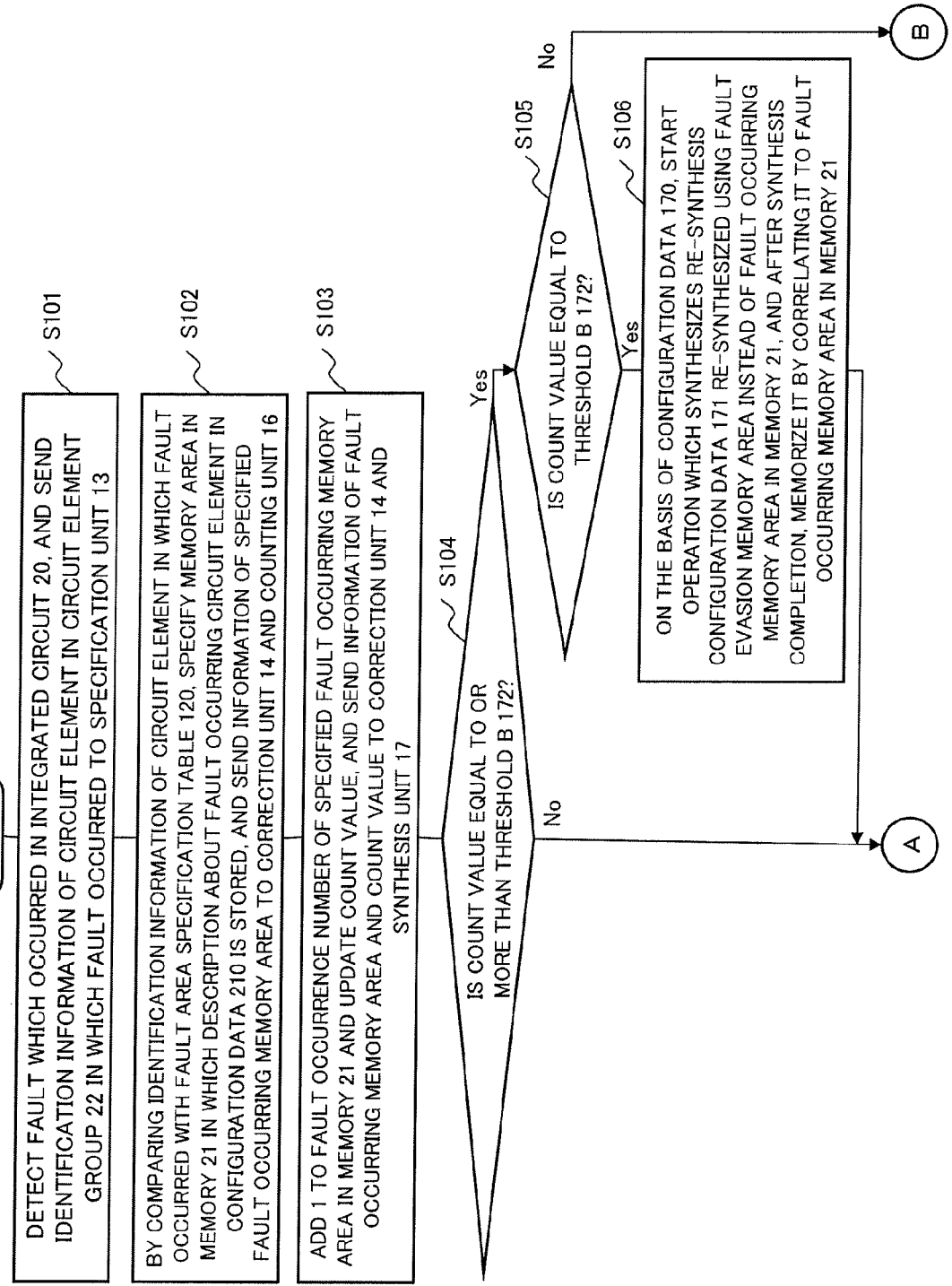
FIG. 2 is a flow chart (½) showing operation of the first exemplary embodiment of the present invention.
Figure 3:
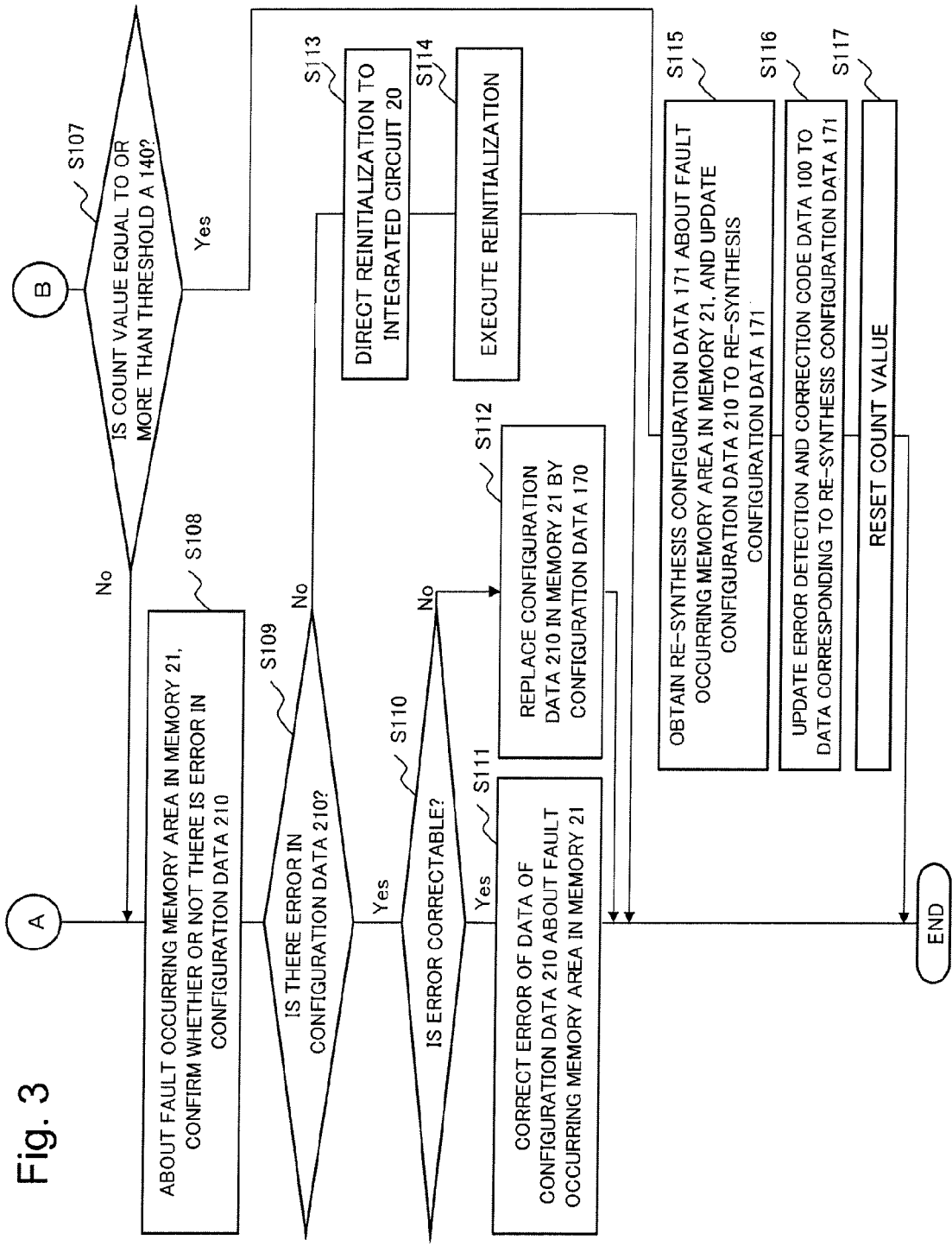
FIG. 3 is a flow chart (²⁄₂) showing operation of the first exemplary embodiment of the present invention.

Next, by referring to the flow charts of FIG. 2 and FIG. 3, operation (processing) of this exemplary embodiment is explained in detail.

The detection unit 11 detects a fault which occurred in the integrated circuit 20 and sends identification information which can identify a circuit element in the circuit element group 22 in which the fault occurred to the specification unit 13 (Step S101). The specification unit 13 compares the received identification information which can identify the circuit element in which the fault occurred with the fault area specification table 120 in the memory unit 12. The specification unit 13 specifies a memory area in the memory 21 in which description about the fault occurring circuit element in the configuration data 210 is stored. And the specification unit 13 sends the identification information which can identify the specified fault occurring memory area to the correction unit 14 and the counting unit 16 (Step S102).

The counting unit 16 adds 1 to the fault occurrence number about the specified fault occurring memory area in the memory 21 and updates the count value. The counting unit 16 sends the identification information which can identify the fault occurring memory area and the count value to the correction unit 14 and the synthesis unit 17 (Step S103).

In case the count value is less than the threshold B 172 (No in Step S104), the correction unit 14 confirms whether or not there is an error in the configuration data 210 about the fault occurring memory area in the memory 21 on the basis of the error detection and correction code data 100 (Step S108).

In case the count value is equal to the threshold B 172 (Yes in Steps S104 and S105), the synthesis unit 17 starts operation which synthesizes the re-synthesis configuration data 171 re-synthesized by using the fault evasion memory area instead of the fault occurring memory area in the memory 21 on the basis of the configuration data 170. After synthesis completion, the synthesis unit 17 memorizes the re-synthesis configuration data 171 by correlating it to the fault occurring memory area in the memory 21 (Step S106), and processing proceeds to Step S108.

In case the count value is larger than the threshold B 172 (Yes in Step S104 and No in Step S105), and the count value is less than the threshold A 140 (No in Step S107), processing proceeds to Step S108. In case the count value is equal to or more than the threshold A (Yes in Step S107), after obtaining the re-synthesis configuration data 171 about the fault occurring memory area in the memory 21 from the synthesis unit 17, the correction unit 14 updates the configuration data 210 in the memory 21 to the re-synthesis configuration data 171 (Step S115). The synthesis unit 17 updates the error detection and correction code data 100 to data corresponding to the re-synthesis configuration data 171 (Step S116). The counting unit 16 resets the count value (Step S117), and the entire processing will end.

In case there is an error in the configuration data 210 (Yes in Step S109), and the error is correctable by the error detection and correction code data 100 (Yes in Step S110), the correction unit 14 corrects the error of data of the configuration data 210 about the fault occurring memory area in the memory 21 by the error detection and correction code data 100 (Step S111), and the entire processing will end.

In case there is an error in the configuration data 210 (Yes in Step S109), and the error is not correctable by the error detection and correction code data 100 (No in Step S110), the correction unit 14 replaces the configuration data 210 in the memory 21 by the configuration data 170 obtained from the synthesis unit 17 (Step S112), and the entire processing will end.

In case there are no errors in the configuration data 210 (No in Step S109), the correction unit 14 directs reinitialization to the integrated circuit 20 (Step S113). The integrated circuit 20 executes reinitialization (Step S114), and the entire processing will end.

By narrowing down to a fault occurring part and performing detection and repair of the fault in an integrated circuit such as an FPGA which defines logic operation by configuration data, there is an effect in this exemplary embodiment that time which fault repair processing needs is reduced. The reason is because the memory unit 12 and the correction unit 14 operate as follows. That is, the memory unit 12 memorizes the fault area specification table 120 which correlates a circuit element in the integrated circuit 20 and a memory area in the memory 21 which stored the configuration data which defines logic operation about the circuit element concerned. And the correction unit 14 corrects the configuration data in the fault occurring memory area in the memory 21 which the specification unit 13 specified on the basis of the fault information and the fault area specification table 120 by the error detection and correction code data 100.

In the integrated circuit such as the FPGA, when bit flip occurs by a soft error in the memory which stores the configuration data, operation logic of the circuit element group changes. As a result, an output result from the integrated circuit will become incorrect and it becomes a fault in the integrated circuit. This fault is different from a permanent fault in hardware, and by repairing the configuration data in which data changed due to the bit flip to the base data, it is possible to recover the fault.

Whether or not the fault is caused by a soft error in the configuration data storage memory can be confirmed by using the error detection and correction code data and by confirming whether or not there is an error in the configuration data which does not agree with the expected value. Since FPGAs of which integration in recent years has advanced highly are equipped with a large-volume configuration data storage memory, when processing which confirms whether or not there is an error is performed about the entire configuration data by the error detection and correction code data, time necessary for fault recovery becomes long.

In this exemplary embodiment, by comparing the fault information which the detection unit 11 detected with the fault area specification table 120, the specification unit 13 specifies the fault occurring memory area in the memory 21. And the correction unit 14 confirms whether or not there is an error in the configuration data only about the fault occurring memory area. In case there is an error, and when the error concerned is a correctable error, the correction unit 14 corrects the error concerned. When the error concerned is not a correctable error, by replacing the configuration data by the base data before the fault occurred, the correction unit 14 recovers the fault.

That is, since the fault repair apparatus 10 of this exemplary embodiment narrows down to the configuration data in the fault occurring memory, not to the entire configuration data, and performs repair of the fault caused by a soft error in the configuration data storage memory, it can reduce time necessary for the fault repair processing.

Although the soft error in the configuration data storage memory usually occurs accidentally, when a problem occurs inside the memory, bit flip may occur frequently in a specific area in the memory and there is a possibility that it becomes a solid fault finally. Accordingly, it is important, before a solid fault in the configuration data storage memory occurs, to predict a memory area which has a possibility to become the solid fault and avoid the solid fault.

In this exemplary embodiment, the synthesis unit 17 re-synthesizes the re-synthesis configuration data 171 about the fault occurring memory area from the original configuration data so that an unused fault evasion area may be used as an area to substitute the fault occurring memory area concerned.

The counting unit 16 counts the fault occurring number for each fault occurring memory area. And when the count value about any of the fault occurring memory areas reaches the threshold A 140, after obtaining the re-synthesis configuration data 171 about the fault occurring memory area concerned from the synthesis unit 17, the correction unit 14 updates the configuration data 210 in the memory 21 to the re-synthesis configuration data 171. By operating as mentioned above, the fault repair apparatus 10 of this exemplary embodiment can predict the fault occurring memory area which has a possibility to become a solid fault and avoid the solid fault.

Also, in order for the synthesis unit 17 to complete synthesis of the re-synthesis configuration data 171, a certain time is necessary. Accordingly, if the synthesis unit 17 starts processing to re-synthesize the re-synthesis configuration data 171 at the time when the numerical value which the counting unit 16 counts reaches the threshold A 140, it takes time for the fault recovery processing. In this exemplary embodiment, when the count value about any of the fault occurring memory areas reaches the threshold B 172 of which the numerical value is less than the threshold A 140, the synthesis unit 17 starts processing to synthesize the re-synthesis configuration data 171 about the fault occurring memory area concerned. By operating as mentioned above, the fault repair apparatus 10 of this exemplary embodiment is able to further reduce time for the fault recovery processing to avoid the solid fault.

Further, there is a case when the fault repair apparatus 10 of this exemplary embodiment is built in the integrated circuit 20.

Second Exemplary Embodiment

Figure 5:
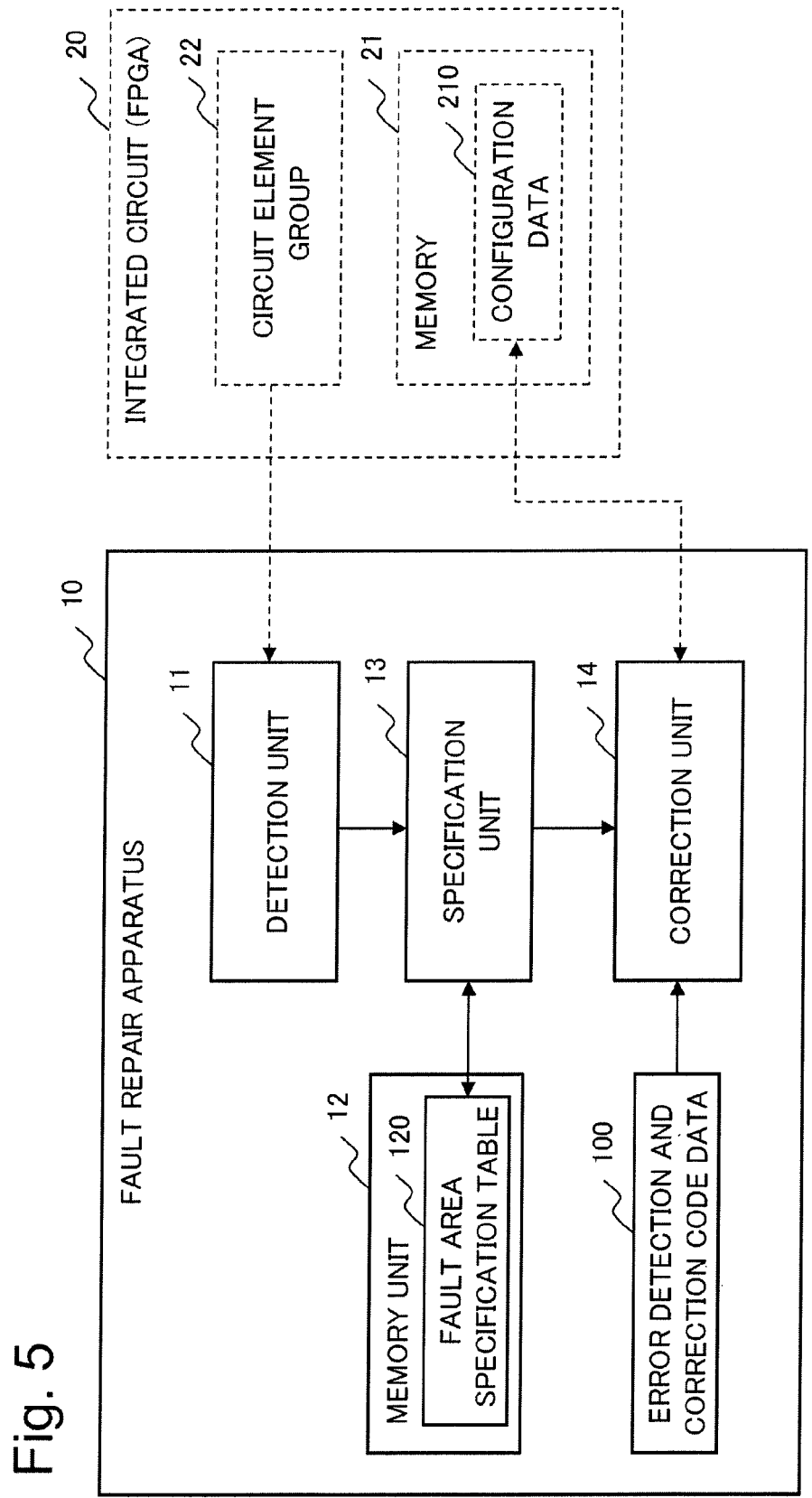
FIG. 5 is a block diagram showing a structure of a fault repair apparatus of a second exemplary embodiment of the present invention.

FIG. 5 is a block diagram showing conceptually a structure of the fault repair apparatus 10 of the second exemplary embodiment of the present invention.

The fault repair apparatus 10 of this exemplary embodiment includes the detection unit 11, the memory unit 12, the specification unit 13 and the correction unit 14.

The detection unit 11 is equipped with the memory 21 which can be updated and which stores the configuration data 210 and the circuit element group 22. The detection unit 11 detects a fault in the integrated circuit 20 in which logic operation about the circuit element group 22 is defined by the configuration data 210 and outputs fault information.

The memory unit 12 memorizes the fault area specification table 120 which correlates whether or not a description in the configuration data 210 related to the fault information exists in any of a plurality of memory areas which the memory 21 includes to the identification information which can identify the memory area.

The specification unit 13 specifies the fault occurring memory area which is a memory area in which the fault occurred from the fault information and the fault area specification table 120.

About the configuration data stored in the fault occurring memory area, the correction unit 14 detects and corrects error data which does not agree with the expected value on the basis of the error detection and correction code data 100 about the configuration data concerned.

Like the first exemplary embodiment, by narrowing down to a fault occurring part and performing detection and repair of the fault in an integrated circuit such as an FPGA which defines logic operation by configuration data, there is an effect in this exemplary embodiment that time which fault repair processing needs is reduced. The reason is because the memory unit 12 and the correction unit 14 operate as follows.

That is, it is because the memory unit 12 memorizes the fault area specification table 120 which correlates whether description in the configuration data 210 related to the fault information exists in any of a plurality of memory areas which the memory 21 includes to the identification information which can identify the memory area, and the correction unit 14 detects and corrects the error, about the configuration data stored in the fault occurring memory area in the memory 21 which the specification unit 13 specified on the basis of the fault information and the fault area specification table 120, on the basis of the error detection and correction code data 100.

<Example of Hardware Configuration>

In the exemplary embodiments described above, each unit or section illustrated in FIGS. 1 and 5 can be regarded as a functional (processing) unit (software module) of a software program. Here, segmentation of the units or sections in those drawings is made to illustrate a configuration for convenience of description, and various configurations can be assumed when implementing them. An example of hardware environment in this case will be described with reference to FIG. 6.

Figure 6:
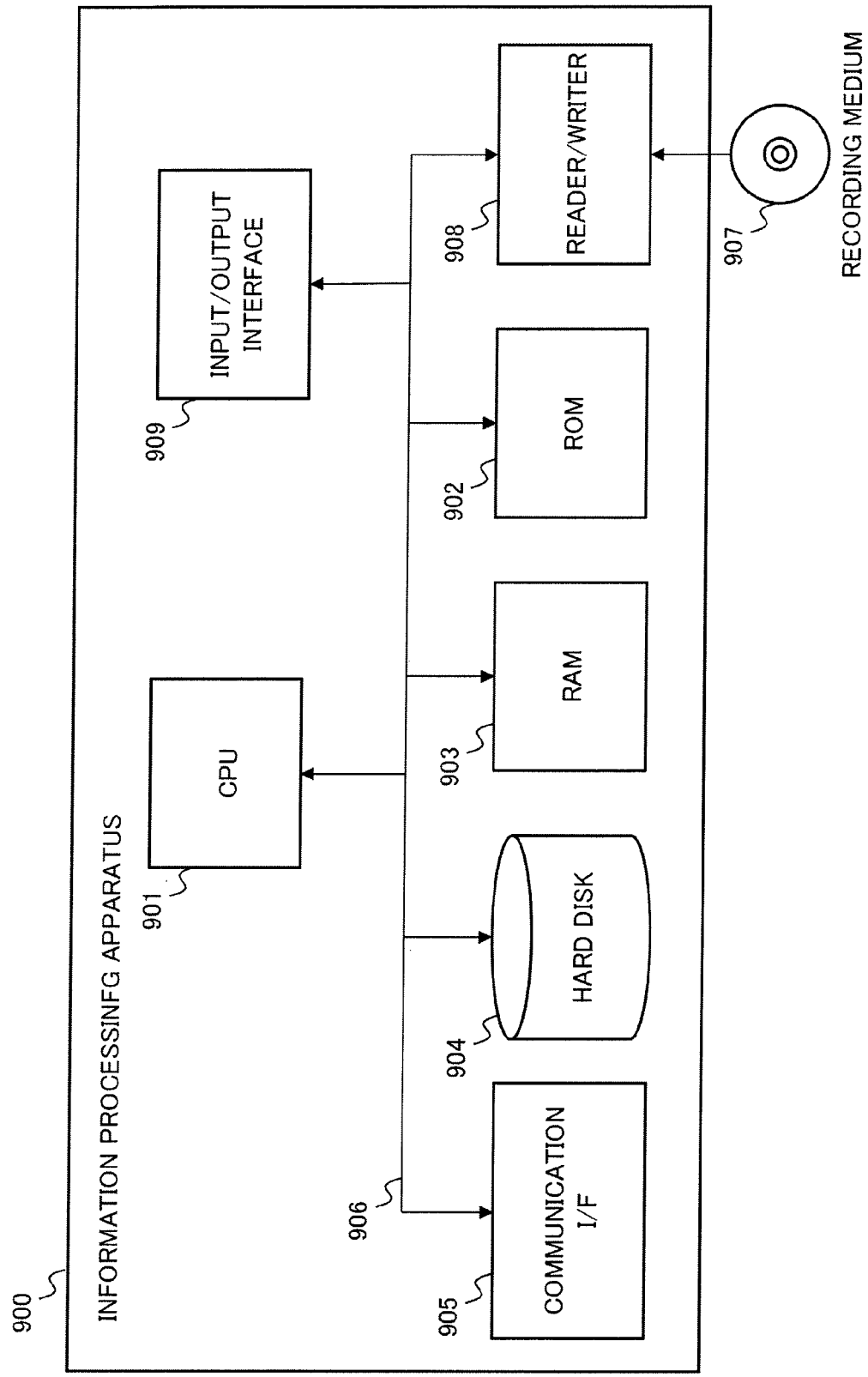
FIG. 6 is a block diagram showing a structure of an information processing apparatus which can execute the fault repair apparatus of the first and the second exemplary embodiment of the present invention.

FIG. 6 is a diagram illustrating a configuration of an information processing apparatus 900 (computer), as an example, which can perform as the fault repair apparatus according to each of the exemplary embodiments of the present invention. That is, FIG. 6 shows a configuration of a computer (information processing apparatus) such as a server which can realize the fault repair apparatuses shown in FIGS. 1 and 5, and represents hardware environment which can realize the functions in the exemplary embodiments described above.

The information processing apparatus 900 shown in FIG. 6 is a general computer comprising a CPU (Central Processing Unit) 901, a ROM (Read Only Memory) 902, a RAM (Random Access Memory) 903, a hard disk (storage device) 904, a communication interface 905 connected with external devices, a reader/writer 908 capable of reading and writing data stored in a recording medium 907 such as a CD-ROM (Compact Disc Read Only Memory) and an input/output interface 909, wherein these components are connected with each other via a bus (communication wire) 906.

Then, the present invention described above taking the exemplary embodiments as examples is achieved by providing the information processing apparatus 900 shown in FIG. 6 with a computer program capable of realizing the functions of the fault repair apparatus 10 in the block configuration diagrams (FIGS. 1 and 5) or in the flow charts (FIGS. 2 and 3), which were referred to in the descriptions of the exemplary embodiments, and by then reading out the computer program into the CPU 901 of the hardware and interpreting and executing the computer program there. The computer program provided to the apparatus may be stored in a readable/writable volatile storage memory (RAM 903) or a non-volatile storage device such as the hard disk 904.

In the above-described case, it is possible to adopt a currently general procedure, as a method of providing a computer program into the hardware, such as a method of installing a program into the apparatus through various types of recording medium 907 and a method of downloading a program via a communication line such as the internet. In such cases, the present invention can be regarded as being constituted by the code constituting the computer program or by the non-transitory computer readable recording medium 907 storing the code.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A computer-implemented fault repair apparatus comprising:
   a processor;
   a memory storing instructions to be executed by the processor by causing the processor to execute:
      a detection unit configured to:
         detect a fault in an integrated circuit, and
         output fault information related to the detected fault, wherein the integrated circuit comprises a circuit element and an updateable memory storing configuration data and wherein a logic operation of the integrated circuit is defined by the configuration data;
      a memory unit configured to store a table which indicates if a description in the configuration data related to the fault information exists in any of a plurality of memory areas included in the updateable memory and stores identification information identifying the memory area in which the description exists;
      a specification unit configured to specify a fault occurring memory area, which is the memory area in which the fault occurred, based on the fault information and the table; and
      a correction unit configured to, for the configuration data stored in the fault occurring memory area, detect and correct error data which is equal to an unexpected value on the basis of error detection and correction code data about the configuration data.

2. The apparatus according to claim 1, wherein, the detection unit outputs, as the fault information, identification information identifying the circuit element in the integrated circuit equipped with a plurality of the circuit elements in which the fault occurred; and the memory unit stores the table which additionally correlates the identification information identifying the circuit element with the identification information which can identify the memory area.

3. The apparatus according to claim 1, wherein, the correction unit, when the correction unit fails to correct the error, replaces the configuration data by the configuration data before the fault occurs.

4. The apparatus according to claim 1, further comprising:
   a counting unit configured to, for the integrated circuit equipped with the memory including a fault evasion memory area which is the memory area unused at usual time, count a fault occurrence number for the fault occurring memory area; and
   a synthesis unit configured to re-synthesize the configuration data so that the configuration data in the fault occurring memory area is used in the fault evasion memory area instead of the fault occurring memory area concerned, and to memorize it as re-synthesis configuration data;
   wherein, the correction unit acquires, when the fault occurrence number about the fault occurring memory area reaches a first threshold, the re-synthesis configuration data memorized by the synthesis unit, and updates the configuration data stored in the memory to the re-synthesis configuration data.

5. The apparatus according to claim 4, wherein, the synthesis unit starts an operation to synthesize the re-synthesis configuration data when the fault occurrence number reaches a second threshold which is smaller than the first threshold.

6. The apparatus according to claim 4, wherein,
the synthesis unit synthesizes the re-synthesis configuration data about each of a plurality of fault occurring memory areas and memorizes the synthesis configuration data by correlating it with the identification information identifying the fault occurring memory area; and
the correction unit acquires, from the synthesis unit, the re-synthesis configuration data which is specified by the identification information which can identify the fault occurring memory area for which the fault occurrence number reached the first threshold.

7. A fault repair method, implemented by a hardware processor, comprising:
detecting a fault in an integrated circuit, wherein the integrated circuit comprises an updateable memory storing configuration data, and a circuit element, wherein a logic operation of the integrated circuit is defined by the configuration data;
outputting fault information related to the detected fault;
storing a table which indicates if a description in the configuration data related to the fault information exists in any of a plurality of memory areas included in the memory and which stores identification information identifying the memory area in which the description exists;
specifying a fault occurring memory area, which is the memory area in which the fault occurred, based on the fault information and the fault area specification table; and
detecting and correcting error data which is equal to an unexpected value for the configuration data stored in the fault occurring memory area based on error detection and correction code data about the configuration data.

8. The method according to claim 7, further comprising:
outputting identification information, as the fault information, identifying the circuit element in the integrated circuit equipped with a plurality of the circuit elements in which the fault occurred; and
storing the table which additionally correlates the identification information identifying the circuit element with the identification information which can identify the memory area.

9. A non-transitory computer-readable medium storing a computer program that, when executed by a processor, causes the processor to execute:
a detection function configured to detect a fault in an integrated circuit and output fault information related to the detected fault, wherein the integrated circuit comprises an updateable memory storing configuration data and a circuit element, wherein a logic operation of the integrated circuit is defined by the configuration data;
a memory function configured to store a table which indicates if a description in the configuration data related to the fault information exists in any of a plurality of memory areas included in the updateable memory and which stores identification information identifying the memory area in which the description exists;
a specification function configured to specify a fault occurring memory area, which is the memory area in which the fault occurred, based on the fault information and the table; and
a correction function configured to, for the configuration data stored in the fault occurring memory area, detect and correct error data which is equal to an unexpected value on the basis of error detection and correction code data about the configuration data.

10. The non-transitory computer-readable medium according to claim 9, wherein:
the detection function outputs identification information, as the fault information, identifying the circuit element in the integrated circuit equipped with a plurality of the circuit elements in which the fault occurred as the fault information; and
the memory function stores the table which additionally correlates the identification information which can identify the circuit element with the identification information identifying the memory area.

* * * * *